United States Patent
Hatamian et al.

(10) Patent No.: US 10,342,366 B2
(45) Date of Patent: Jul. 9, 2019

(54) ADJUSTABLE MAGNETIC SURFACE MOUNT

(71) Applicant: MaxwellHook LLC, Rancho Santa Margarita, CA (US)

(72) Inventors: Mehdi Hatamian, Rancho Santa Margarita, CA (US); Kamran Ghobadi, Irvine, CA (US)

(73) Assignee: MAXWELLHOOK LLC, Rancho Santa Margarita, CA (US)

( * ) Notice: Subject to any disclaimer, the term of this patent is extended or adjusted under 35 U.S.C. 154(b) by 69 days.

(21) Appl. No.: 15/178,194

(22) Filed: Jun. 9, 2016

(65) Prior Publication Data
US 2017/0354275 A1    Dec. 14, 2017

(51) Int. Cl.
| | |
|---|---|
| *A47G 1/17* | (2006.01) |
| *F16M 13/02* | (2006.01) |
| *F21V 33/00* | (2006.01) |
| *A47G 1/20* | (2006.01) |
| *F21Y 115/10* | (2016.01) |

(52) U.S. Cl.
CPC ............... *A47G 1/17* (2013.01); *A47G 1/205* (2013.01); *F16M 13/02* (2013.01); *F21V 33/0032* (2013.01); *F21Y 2115/10* (2016.08)

(58) Field of Classification Search
CPC ................... A47G 1/17; F21V 21/096
See application file for complete search history.

(56) References Cited

U.S. PATENT DOCUMENTS

| | | | |
|---|---|---|---|
| D679,164 S * | 4/2013 | Chen | D8/70 |
| 2004/0232291 A1* | 11/2004 | Carnevali | F16M 13/00 248/206.5 |
| 2011/0099826 A1* | 5/2011 | Chen | B25H 7/02 33/666 |
| 2013/0105642 A1* | 5/2013 | Marq | G09F 7/04 248/121 |
| 2013/0221189 A1* | 8/2013 | Kubin | F16M 13/04 248/683 |
| 2015/0034794 A1* | 2/2015 | Durante | F16M 11/041 248/544 |
| 2016/0150861 A1* | 6/2016 | Yao | A45C 11/00 224/245 |
| 2016/0223149 A1* | 8/2016 | Gerpheide | F21L 4/00 |
| 2016/0246328 A1* | 8/2016 | Christie, II | G06F 1/1632 |

\* cited by examiner

*Primary Examiner* — Evan P Dzierzynski
(74) *Attorney, Agent, or Firm* — Genius Patent APC; Bruce Hare

(57) ABSTRACT

A surface mount includes a base plate, set of magnets, and magnet retaining plate. Magnetic coupling between the magnets and the metallic base plate that has an area larger than the magnet area allows for accurate positioning of the object after installation via adjustments in horizontal, vertical, and angular position of the object. Marking pegs allow for trouble-free and easy marking of the mounting surface for installing the magnet retaining plate. Optional spacers provide flexibility for use with various mounted objects. Lighting and lighting control allow for visual effects associated with the surface mount.

15 Claims, 9 Drawing Sheets

ADJUSTABLE MAGNETIC SURFACE MOUNT

BACKGROUND

Many people wish to mount various elements such as picture frames, art pieces, mirrors, etc., onto a wall or other surface. Existing solutions require users to measure precisely and provide only one chance to align or otherwise position the mounted object relative to other elements or features. In addition, in some cases users may have to align a mount to the mounted object before or after positioning the object relative to the mounting surface.

Thus there is a need for a solution that allows users to adjust the position and/or orientation of such mounted objects during and after installation.

SUMMARY

Some embodiments may provide an adjustable magnetic surface mount that allows users to accurately install and/or position hanging objects such as picture frames. A base plate may be able to be attached to the back of the hanging object. The base plate may be attached using adhesive or other appropriate elements.

A magnet retaining plate and set of magnets may be attached to the wall or other mounting surface. The magnet retaining plate may position the magnets relative to each other, and appropriately for use with the base plate. Each magnet may include a through-hole (and the magnet retaining plate may include associated through holes) that may allow the magnet (and magnet retaining plate) to be secured to the mounting surface.

Some embodiments may include one or more spacers that may be placed between the magnet retaining plate and/or magnets and the mounting surface, depending on a recess depth of the mounted object. In addition, such spacers may be used to reduce the attractive force between the magnets and the base plate (and/or other elements) during installation.

In some embodiments, a set of marking pegs may allow a user to accurately mark the mounting surface for placement of the magnet retaining plate and/or magnets. Such pegs may be able to be positioned using the through holes in the magnets and magnet retaining plates during installation.

During use, the base plate may be installed onto the mounting object (e.g., by peeling an adhesive backing layer and pressing the base plate onto the object). Next, the mounting surface may be marked using the marking pegs. The magnet retaining plate and/or magnets may then be attached to the mounting surface. Optionally, spacers may be placed between the magnet retaining plate and/or magnets and the mounting surface. The object may then be positioned and/or oriented while held in place by magnetic force.

The preceding Summary is intended to serve as a brief introduction to various features of some exemplary embodiments. Other embodiments may be implemented in other specific forms without departing from the scope of the disclosure.

BRIEF DESCRIPTION OF THE SEVERAL VIEWS OF THE DRAWINGS

The exemplary features of the disclosure are set forth in the appended claims. However, for purpose of explanation, several embodiments are illustrated in the following drawings.

DETAILED DESCRIPTION

Figure 1:
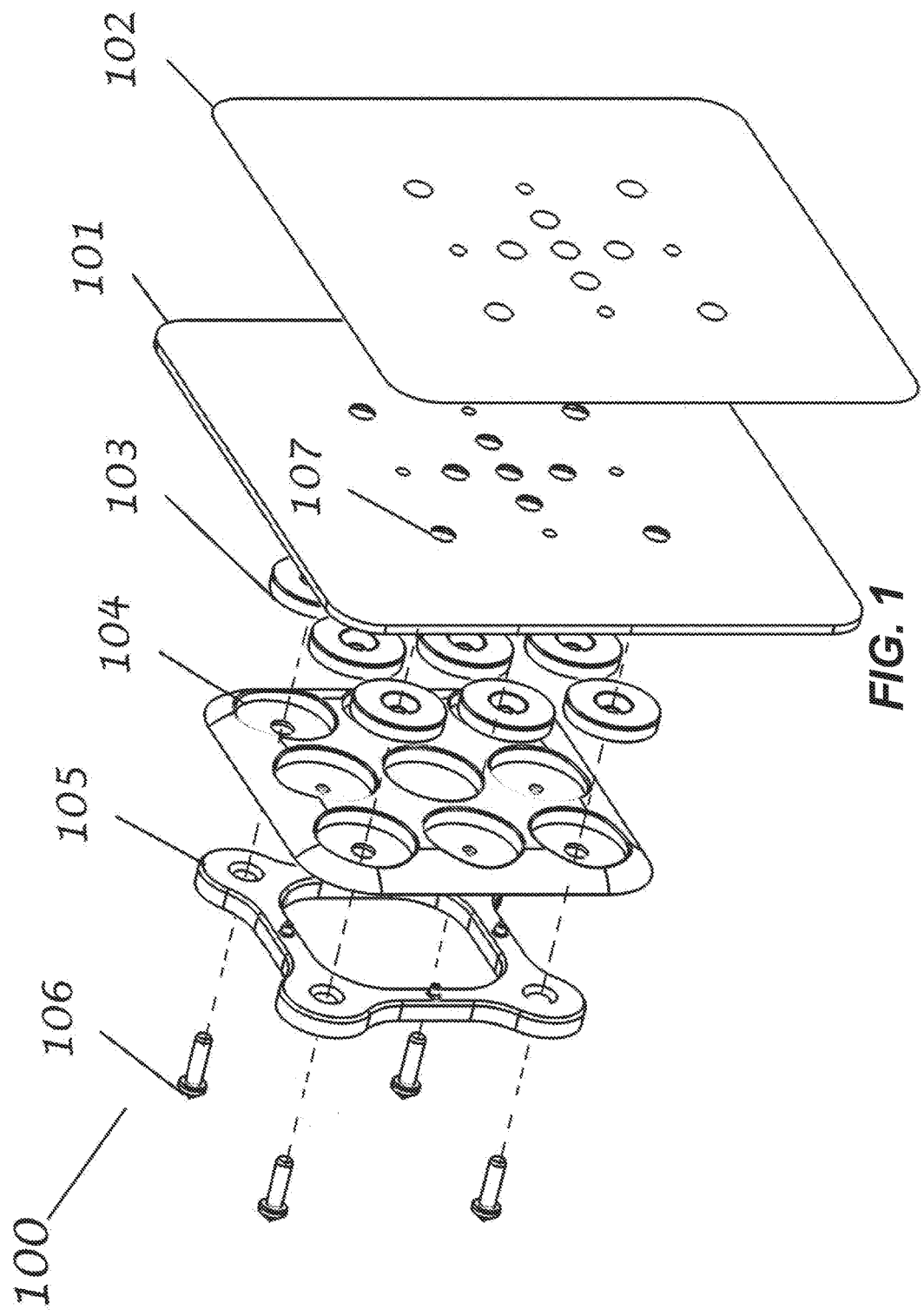
FIG. 1 illustrates an exploded perspective view of a surface mount according to an exemplary embodiment.

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments generally provide an adjustable magnetic surface mount.

The surface mount (or "device" or "system") described in this disclosure solves various mounting problems using a magnetic approach that allows the object to be placed on the surface at any desired position and orientation with extreme accuracy without having to make any accurate measurements and at the same time making the installation process extremely fast and trouble-free.

A metallic base plate may be installed on the back of the object, for example the back of a picture frame. The metallic base plate magnetically couples to magnets placed in a magnet retaining plate (or "magnet housing") that may be attached to the mounting surface. Once the object is coupled to the magnetic base, the object may be easily adjusted in both the horizontal and vertical dimensions as well as rotated to any desired angle.

The metallic plate attached to the back of the object may be larger than the area covered by the magnets in the magnet retaining plate attached to the surface, hence allowing for the object to be moved in horizontal and vertical directions by the amount the plate is larger than the base.

For example if the metallic base plate is six inches by six inches in size and the area covered by the magnets in the base is four inches by four inches, then the object can be moved by one inch up, one inch down, one inch to the left, and/or one inch to the right while still applying the force of all the included magnets. The size of the plate may be chosen to allow for any desired margin for adjustment. For picture frames installed on a wall, a one inch margin in all four directions may be sufficient to be able to adjust the frame position on the wall to the exact desired position once it is first installed at an approximate position by simple eyeballing the location without making any precise measurements.

A first exemplary embodiment provides a surface mount including: a metallic base plate with a peel back adhesive layer coupled to a first surface of the metallic base plate; a set of magnets able to be movably coupled to the metallic base plate; and a magnet retaining plate that retains the set of magnets, where the set of magnets and the magnet retaining plate are able to be fixedly coupled to a mounting surface and the metallic base plate is able to be fixedly coupled to a mounting object.

A second exemplary embodiment provide a surface mount including: a metallic base plate with a first peel back adhesive layer coupled to the metallic base plate; a set of magnets able to be movably coupled to the metallic base plate; and a magnet retaining plate fixedly coupled to the set of magnets, the magnet retaining plate having a second peel back adhesive layer, wherein the set of magnets and the magnet retaining plate are able to be fixedly coupled to a mounting surface via the second peel back adhesive layer and the metallic base plate is able to be fixedly coupled to a mounting object via the first peel back adhesive layer.

A third exemplary embodiment provides a mounting device including: a first peel back adhesive layer coupled to a mounting board; an embedded metallic base plate fixedly coupled to the mounting board; a set of magnets able to be movably coupled to the metallic base plate; and a magnet retaining plate fixedly coupled to the set of magnets, the magnet retaining plate having a second peel back adhesive layer, wherein the set of magnets and the magnet retaining plate are able to be fixedly coupled to a mounting surface via the second peel back adhesive layer and the mounting board is able to be fixedly coupled to a mounting object via the first peel back adhesive layer.

Although several exemplary embodiments are described throughout this specification that describe a peel back adhesive for attaching the metallic base to a mounting object (such as a picture frame), the disclosure is not limited to such. Specifically, the metallic base and the mounting object may be attached by different means such as through-holes and screws, pins, notches, keys, and/or other appropriate elements that may allow the base plate to be attached to various objects, as appropriate. Similarly, several exemplary embodiments are described throughout this specification that describe a peel back adhesive for connecting the surface mount to a mounting surface (e.g., a wall). The disclosure is, however, not limited to such. Specifically, surface mount and the mounting surface can be attached in different ways such as through-holes and screws, pins, notches, keys, and/or other appropriate elements that may allow the base plate to be attached to various objects, as appropriate.

FIG. 1 illustrates an exploded perspective view of a surface mount 100 according to an exemplary embodiment. As shown, the surface mount may include a base plate 101 with peel-back adhesive 102, a set of magnets 103, a magnet retaining plate 104, a spacer 105, and a set of marking pegs 106.

The base plate 101 may be metallic and may have various appropriate surface finishes depending on the specific application. The base plate may be various shapes (e.g., rectangular, square, round, triangular, polygonal, irregular or arbitrary shapes, etc.) and/or sizes, as appropriate for a particular object.

The peel-back adhesive 102 may be used to attach a surface of the base plate 101 to the back of the object to be mounted. Different embodiments may include and/or allow use of different attachment features depending on the object (and/or properties of the object, such as weight). For instance, some embodiments may provide mounting screws to attach heavier solid objects to the base plate. The base plate may include various through-holes, pins, notches, keys, and/or other appropriate elements that may allow the base plate to be attached to various objects, as appropriate. For instance, the through-holes 107 and a set of screws (not shown) may be used instead of (or in addition to) the peel back adhesive to connect the base plate 101 to a picture frame or other mounting object. The opposite surface (e.g., the parallel surface of the opposing face) of the base plate may be able to be magnetically coupled to the set of magnets 103 such that the mounted object is held in position against the mounting surface, while allowing the object to be repositioned or reoriented.

Each magnet 103 may include a countersink hole in the middle. The magnets may be various appropriate shapes (e.g., round, square, etc.) may be positioned (or "retained" or "housed") by the magnet retaining plate 104, where the magnet retaining plate may be a non-magnetic material such as plastic. The magnet retaining plate may also be made of metallic material. In some embodiments, the magnets 103 and magnet retaining plate 104 may be provided by a single element (e.g., the magnets may be embedded into a molded plastic form, the magnets may be adhesively attached to a base, etc.).

An optional spacer 105 may be placed behind the magnet retaining plate 104 if desired to change the distance of the object from the surface (e.g., when used with a recessed frame). Multiple spacers 105 may be used to achieve the desired distance, as needed. The magnet retaining plate 104 may be attached to the surface (through the spacers, if any) using screws (not shown) that go through each hole in the magnet 103 and associated holes in the magnet retaining plate 104 and spacer(s) 105 (if any).

The pegs 106 may be used prior to installation to mark the mounting surface. The tip of each peg may be made of a carbon material similar to a conventional pencil. At least a portion of each peg may be metallic such that the pegs are attracted to the magnets 103. Prior to the installation of the surface mount to a mounting surface, the pegs may be inserted into the spacer holes going through the holes on the magnet retaining plate 104, the holes on the magnets 103, and the holes 107 on the base plate 101 and pressed against the mounting surface to mark the location of the spacer holes 107 on the mounting surface. A set of holes may then be generated on the mounting surface at the marked locations. The pegs may then be set aside (or discarded) and the magnet retaining plate 104 and, optionally, the spacer 105 may be attached to the mounting surface using a set of screws that go through the holes on the magnets 103, the holes on the magnet retaining plate 104, the holes on the spacer 105 (if used), and into the holes that are generated on the mounting surface.

Figure 2:
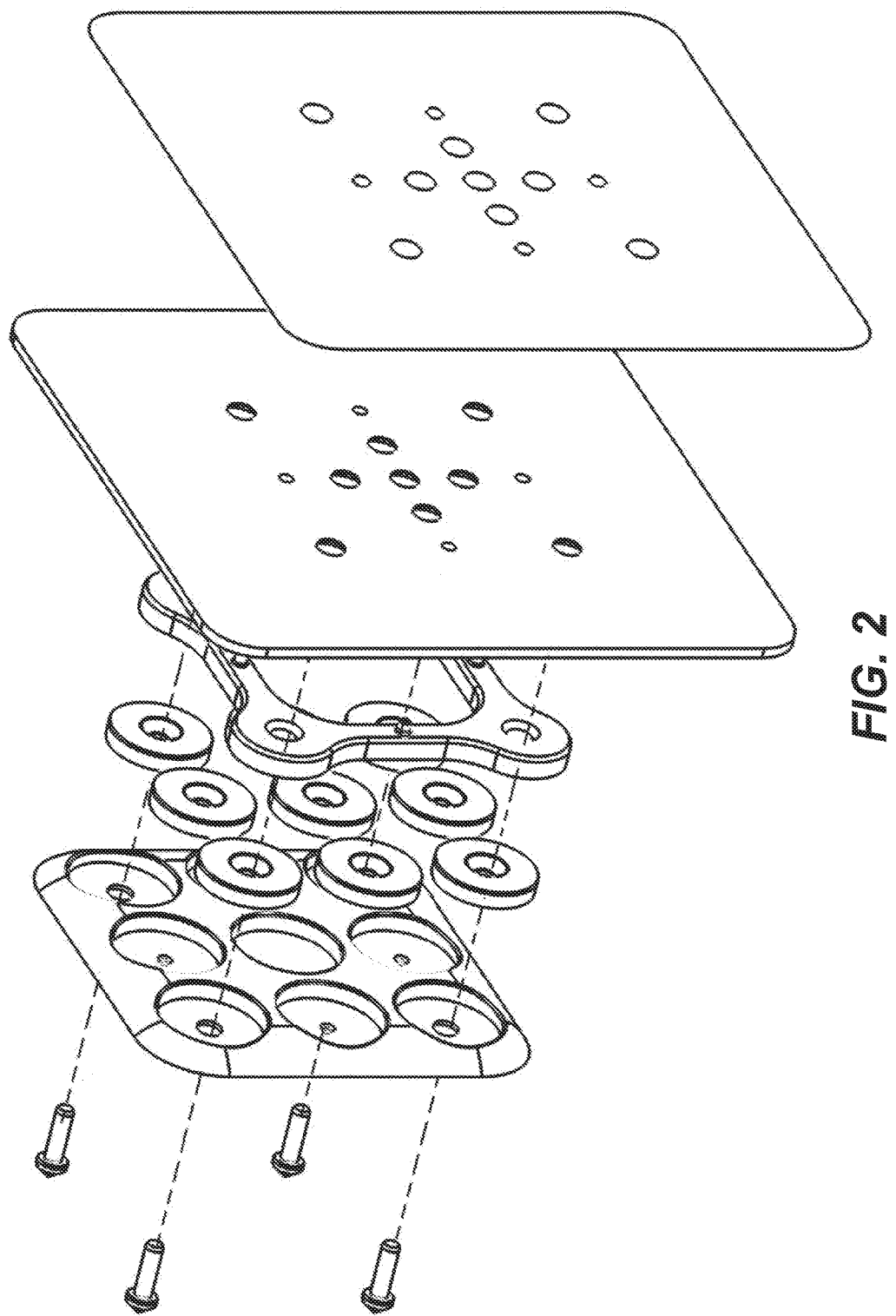
FIG. 2 illustrates an exploded perspective view of the surface mount of FIG. 1 as provided to a user.

FIG. 2 illustrates an exploded perspective view of the surface mount 100 as provided to a user (e.g., as provided in consumer packaging). As shown, the packaged mount may include the same components as described above in reference to FIG. 1.

The operation of the surface mount will be described using the example of installing a picture frame on a wall. All the components of the device are held together with the force of the magnets 103 and can be handled by the user as one module prior to installation. The user may first peel the adhesive backing 102 from the base plate 101 and attach the plate to the back of the picture frame at approximately the center of the back of the frame. In some cases, an art piece or other mounted object may be placed directly onto a substrate (e.g., poster board) such that the base plate may be attached to the substrate. The surface mount 100 is able to accommodate lack of precision in positioning and/or orientation of the plate 101 on the back of the frame.

The whole assembly 100 as one unit may then be attached to the back of the picture frame. The user may then position the frame against the wall at an approximate position where the user wishes to install the frame. The assembly allows for imprecision of position and/or orientation and may be "eye-balled" if desired without having to make any measurements.

By pressing the frame against the wall, the tip of each peg 106 may create a mark on the wall. These marks may then be used to drill holes in the wall to allow installation of conventional anchors in the wall for the screws that attach the magnet retaining plate 104 to the wall. Different embodiments may allow for different installation operations depending on the mounting surface. For instance, solid or backed walls may allow for screws or other fasteners to be secured directly into the surface without use of anchors.

The user may then remove the pegs 106 out and disassemble the mount 100. The spacer 105 may be placed between the metallic base plate 101 and the magnets 103 in order to reduce the force between the magnets and the metallic plate before the installation. This is done to make it easier for the user to take the assembly 100 apart after marking the wall with the pegs 106. Alternatively and/or conjunctively, the spacer(s) 105 may be mounted behind the magnet retaining plate to adjust the distance of the frame from the wall if desired. The magnet retaining plate 104 may be attached to the wall using flat head screws.

Figure 3:
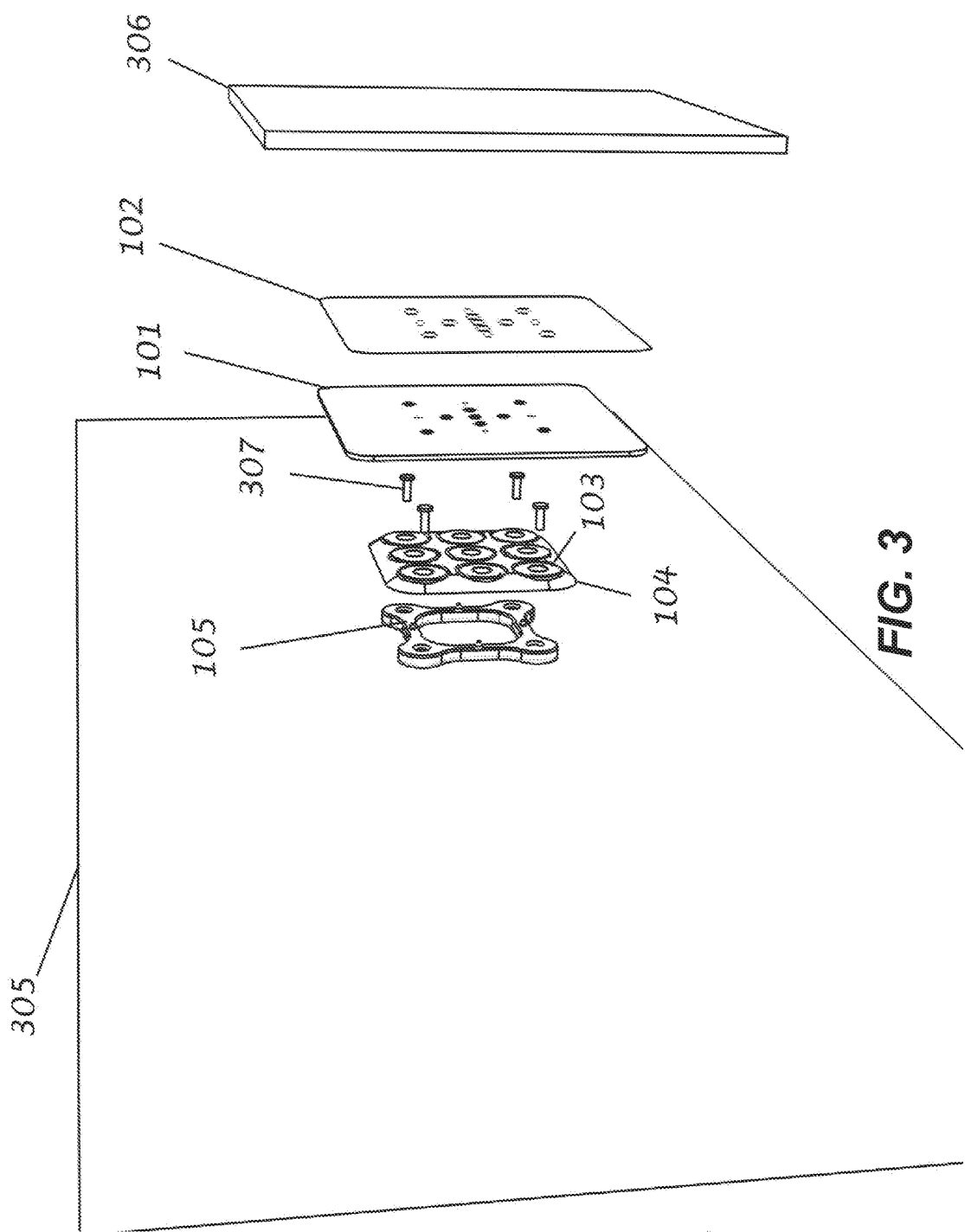
FIG. 3 illustrates an exploded perspective view of the surface mount of FIG. 1 as installed on a surface.

FIG. 3 illustrates an exploded perspective view of the surface mount 100 as installed on a surface 305 and object 306. In this example, the surface is an essentially flat, smooth surface. Different surfaces may be shaped differently (e.g., curved) and/or include different textures or materials (e.g., plaster, paint, wood, etc.).

The magnet retaining plate 104 may be fixedly attached to the wall 305 using a set of screws (and/or other fasteners such as nails, hooks, etc.) such as flat head screws 307. The metallic base plate 101 may be fixedly attached to the back of a picture frame 306 using the peel back adhesive 102. An optional spacer 105 is shown in this example. The picture frame 306 may be placed on the wall 305 and adjusted to the exact position needed by moving the frame 306 up, down, left, right and/or rotating the frame as needed. The magnetic force providing an adjustable or movable coupling between the base plate 101 and the magnets 103. The frame may also be leveled easily by placing a conventional level on the top edge of the frame (or any other object to be mounted) and rotating the frame until the level indicates that the top edge of the frame is horizontally leveled. A small and inexpensive leveling module may be offered with the device and placed inside the package for user convenience.

The example of FIG. 3 uses nine identical magnets 103. The number of magnets needed may depend on the weight of the object and may be any desired number. In addition, different embodiments may include differently sized magnets (and/or otherwise include different magnets with different specific attributes for a particular application). For heavier objects, if the number of magnets in one mounting system is not enough, then multiple modules may be used on the back of the object at different locations. For example, for a very large life-size and heavy picture frame four such modules may be positioned at the four corners of the back of the frame. This method is extremely beneficial for such large and heavy objects as it makes the installation and handling of the frame considerably easier than conventional methods given the size and the weight of the object.

Figure 4:
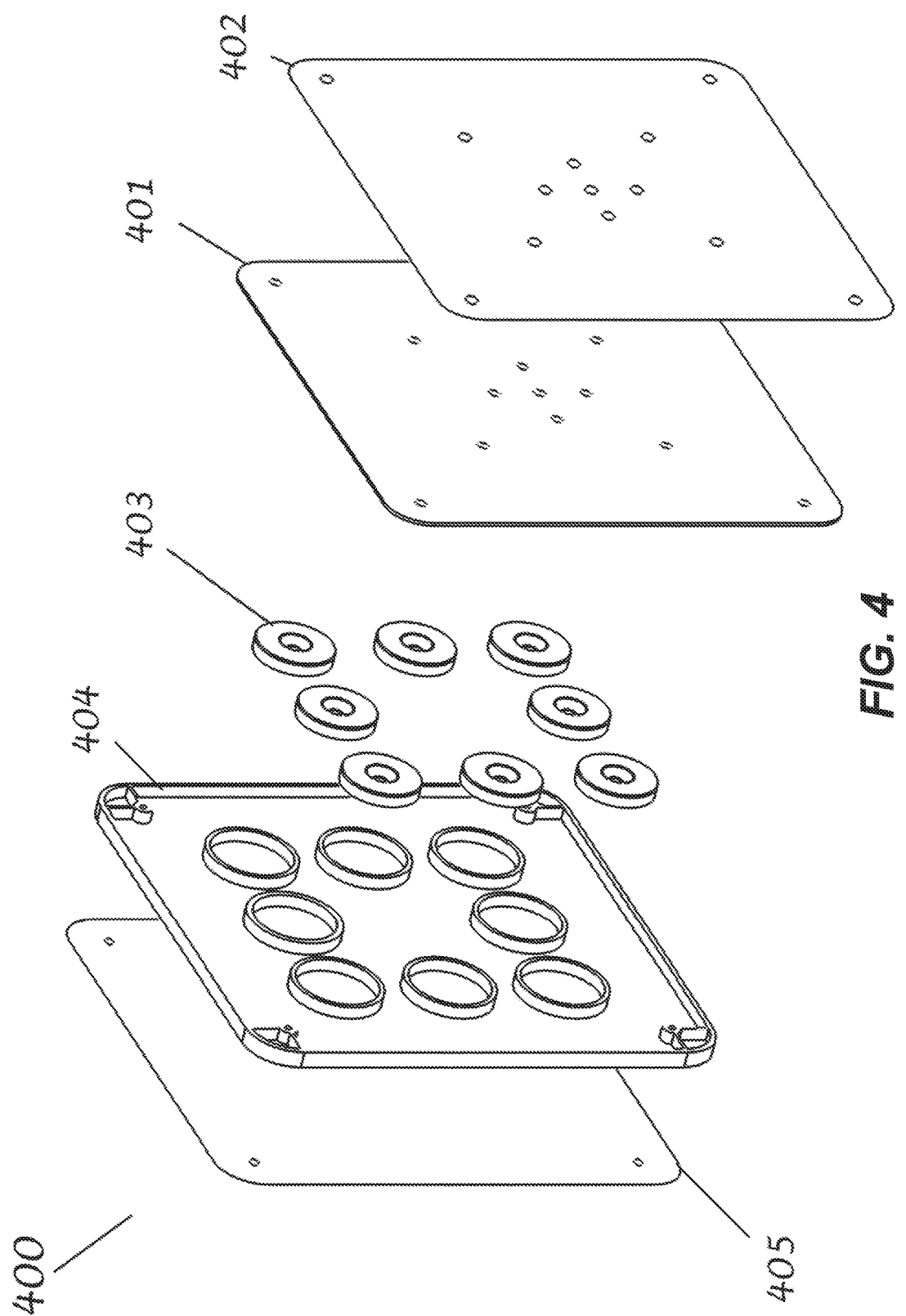
FIG. 4 illustrates an exploded perspective view of an alternative surface mount according to an exemplary embodiment.

FIG. 4 illustrates an exploded perspective view of an alternative surface mount 400 according to an exemplary embodiment. As shown, the mount may include a base plate 401 with adhesive layer 402, a set of magnets 403, and a magnet retaining plate 404 with adhesive layer 405. Such a mount 400 may be appropriate for lighter objects.

During installation, the entire module 400 may first be attached to the back of a picture frame in a similar manner to that described above. The adhesive backing may be peeled from layer 405 while the magnet retaining plate 404 is still attached to the metallic base plate 401 with the force of the magnets 403 while the picture frame is positioned at the approximate desired position on the wall and the frame may be pressed against the wall causing the magnet retaining plate 404 to be adhesively attached to the wall. The picture frame may then be easily adjusted same way as before.

Figure 5:
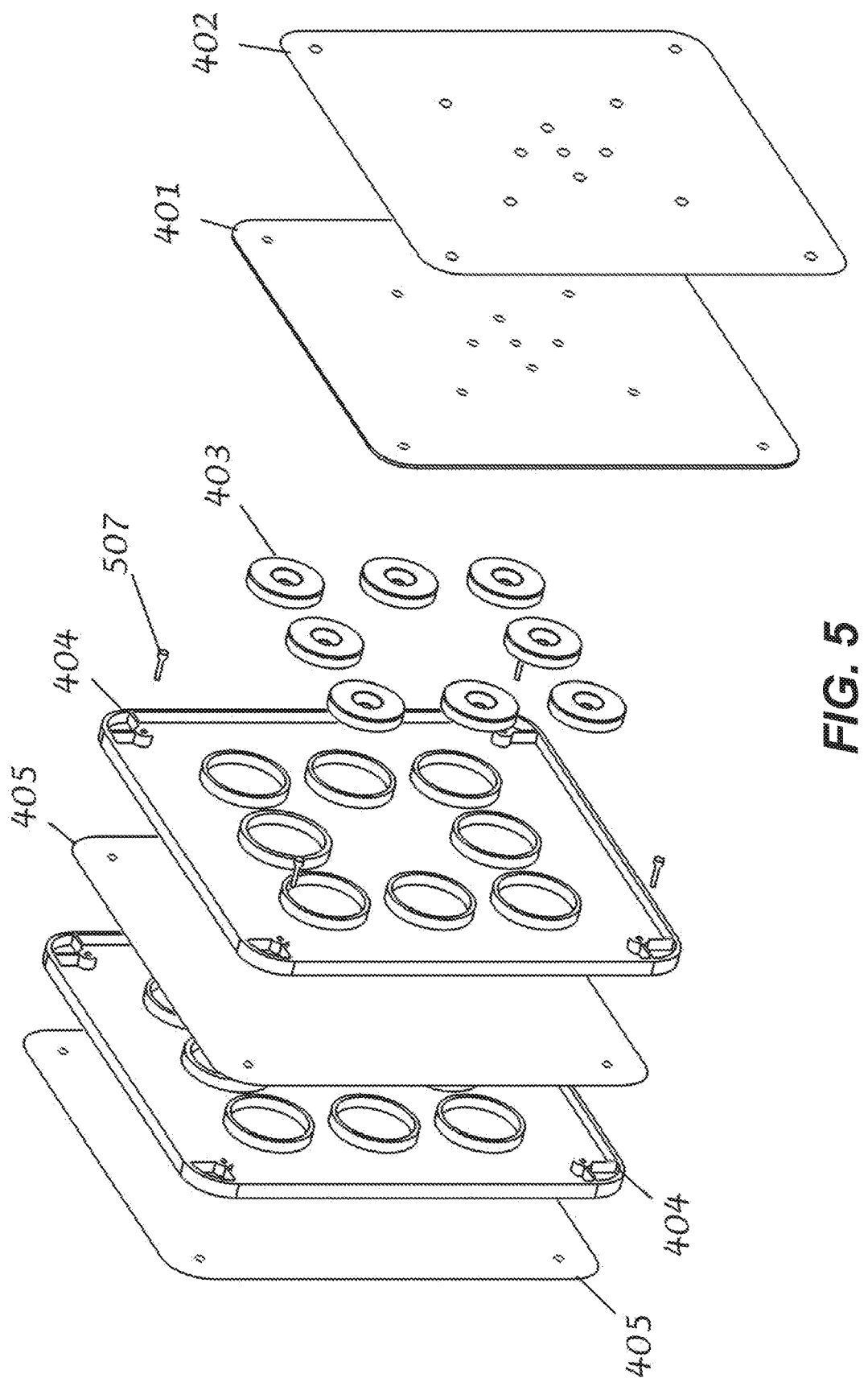
FIG. 5 illustrates an exploded perspective view of the alternative surface mount of FIG. 4 that includes multiple spacers.

FIG. 5 illustrates an exploded perspective view of the alternative surface 400 that includes multiple magnet retaining plates 404 acting as spacers. The additional magnet retaining plate(s) may be not be associated with any magnets 403 (i.e., only the magnet retaining plate closest to the frame may be associated with magnets). The spacer(s) 404 may be attached to the magnet retaining plate 404 using screws 507 and the final spacer 404 may be attached to the mounting surface using adhesive 405.

Some embodiments may include accent lighting that can be controlled remotely and wirelessly. Such lighting may be integrated into a magnet base plate, which creates a shadow lighting effect coming out of the edge of the object once placed on the mounting surface. This is particularly attractive and useful for picture frames.

Figure 6:
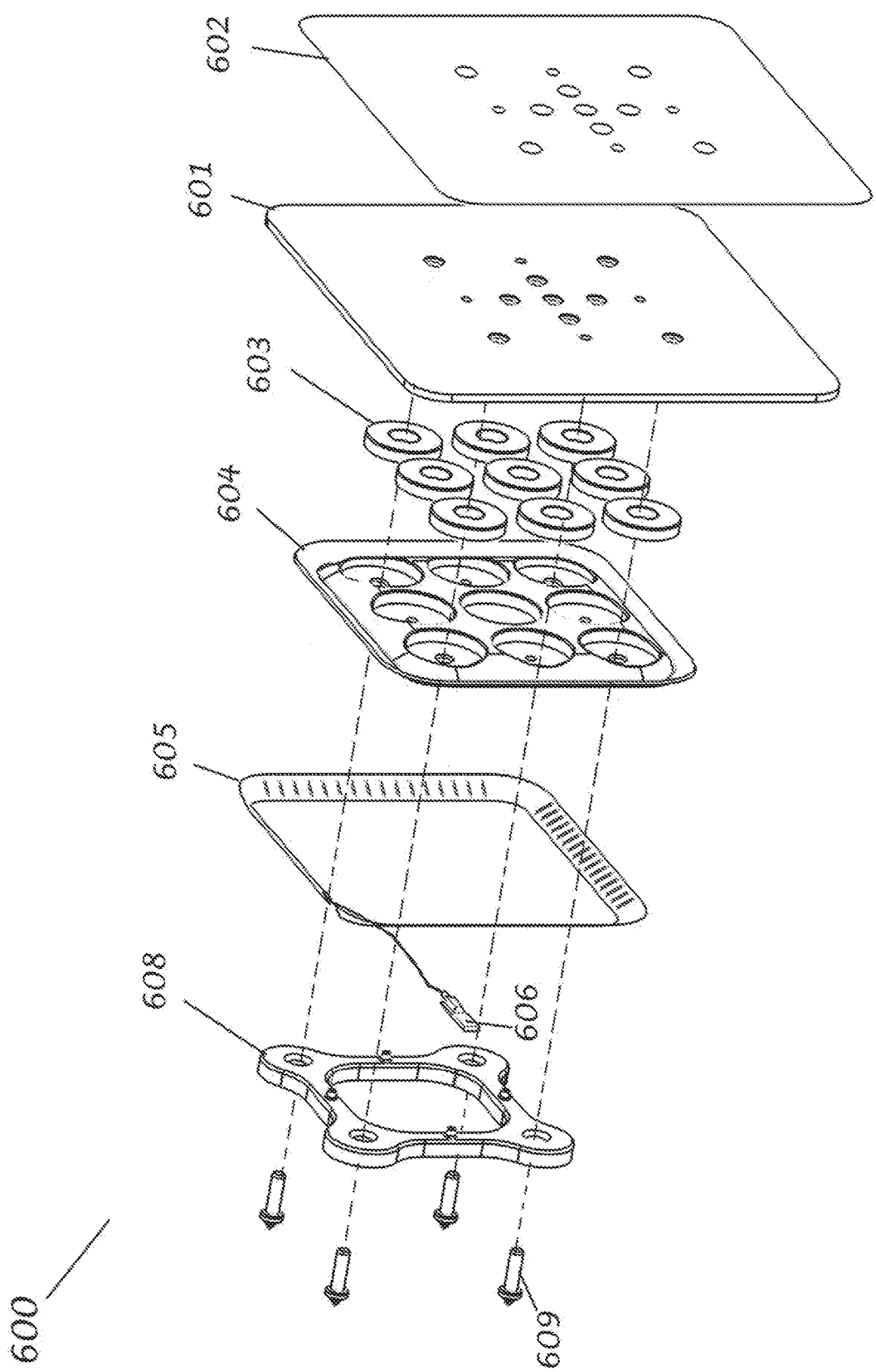
FIG. 6 illustrates an exploded perspective view of a lighted surface mount according to an exemplary embodiment.

FIG. 6 illustrates an exploded perspective view of a lighted surface mount 600 according to an exemplary embodiment. As shown, the lighted surface mount may include a base plate 601, peel back adhesive 602, a set of magnets 603, a magnet retaining plate 604, a spacer 608, and marking pegs 609 that are similar to the analogous elements described above.

The magnet retaining plate 604 may include an angled edge wide enough to attach a light emitting diode (LED) light strip 605 and route wires to the back of the magnet retaining plate 604. A lighting control module 606 may be placed inside the back of the magnet retaining plate 604 and connected to the LED strip wires.

The control module may be connected to a power source via a connector coming out of the wall the other side of which may be connected to an appropriate power source such as a battery or power supply unit inside the wall and connected to a power line. In some embodiments, the power source may be embedded into a frame or other appropriate item. The control module 606 may be able to control the intensity and/or color of the LED lights on the strip via commands that are sent wirelessly from a radio frequency transmitter module. The lighting control module may also have an integrated Bluetooth receiver (and/or other appropriate communication modules or interfaces) allowing the LED lights to be controlled from using an application running on a mobile device (e.g., a smartphone, tablet, personal computer, laptop, etc.). Some embodiments may include manual interface elements such as knobs, buttons, etc., that may be used to control the lighting.

Figure 7:
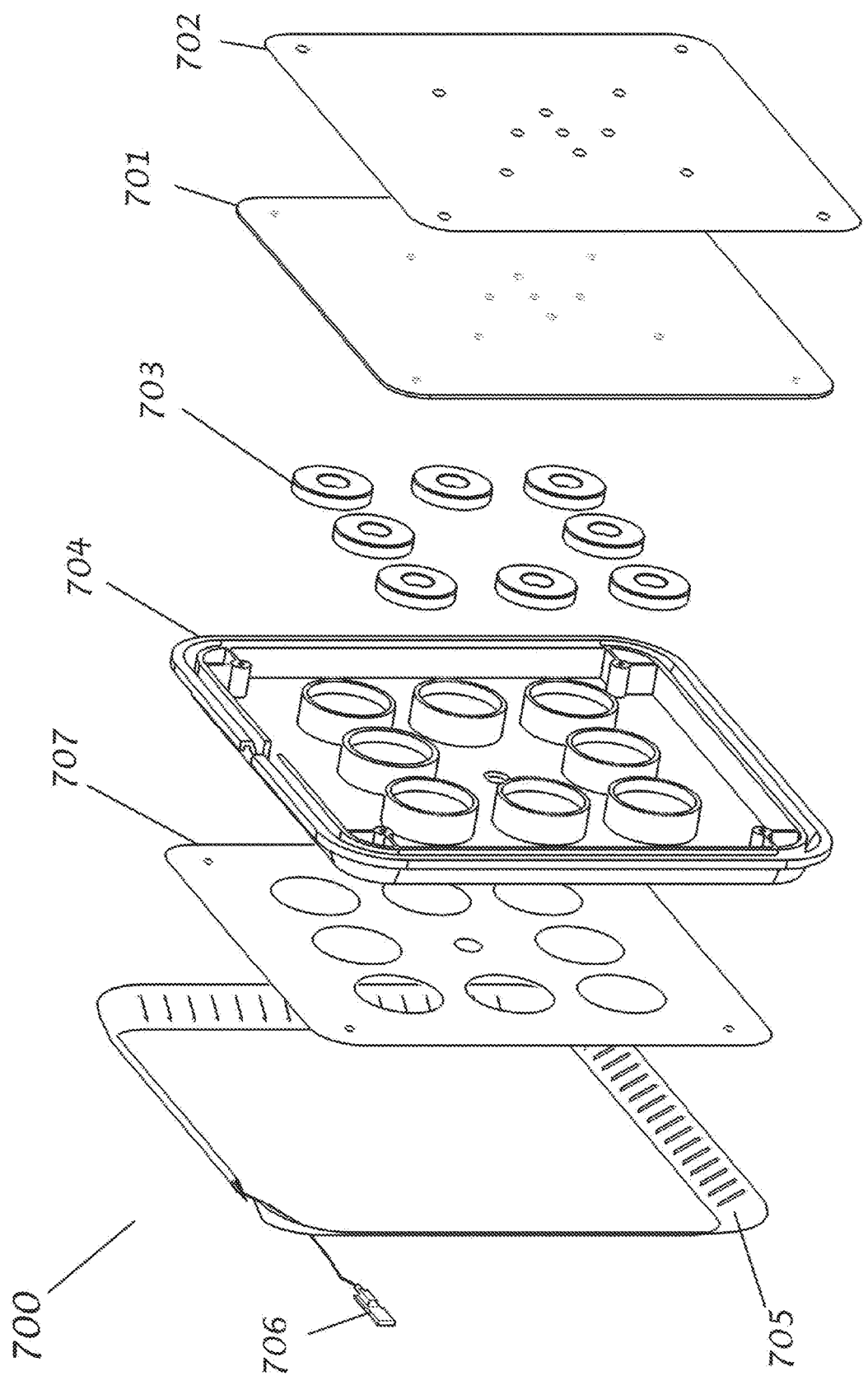
FIG. 7 illustrates an exploded perspective view of an alternative lighted surface mount according to an exemplary embodiment.

FIG. 7 illustrates an exploded perspective view of an alternative lighted surface mount 700 according to an exemplary embodiment. As shown, the accent lighting may be integrated into a simplified version of the device. This example device includes a base plate 701, adhesive layer 702, magnets 703, magnet retaining plate 704, adhesive layer 707, LED strip 705, and control module 706.

Figure 8:
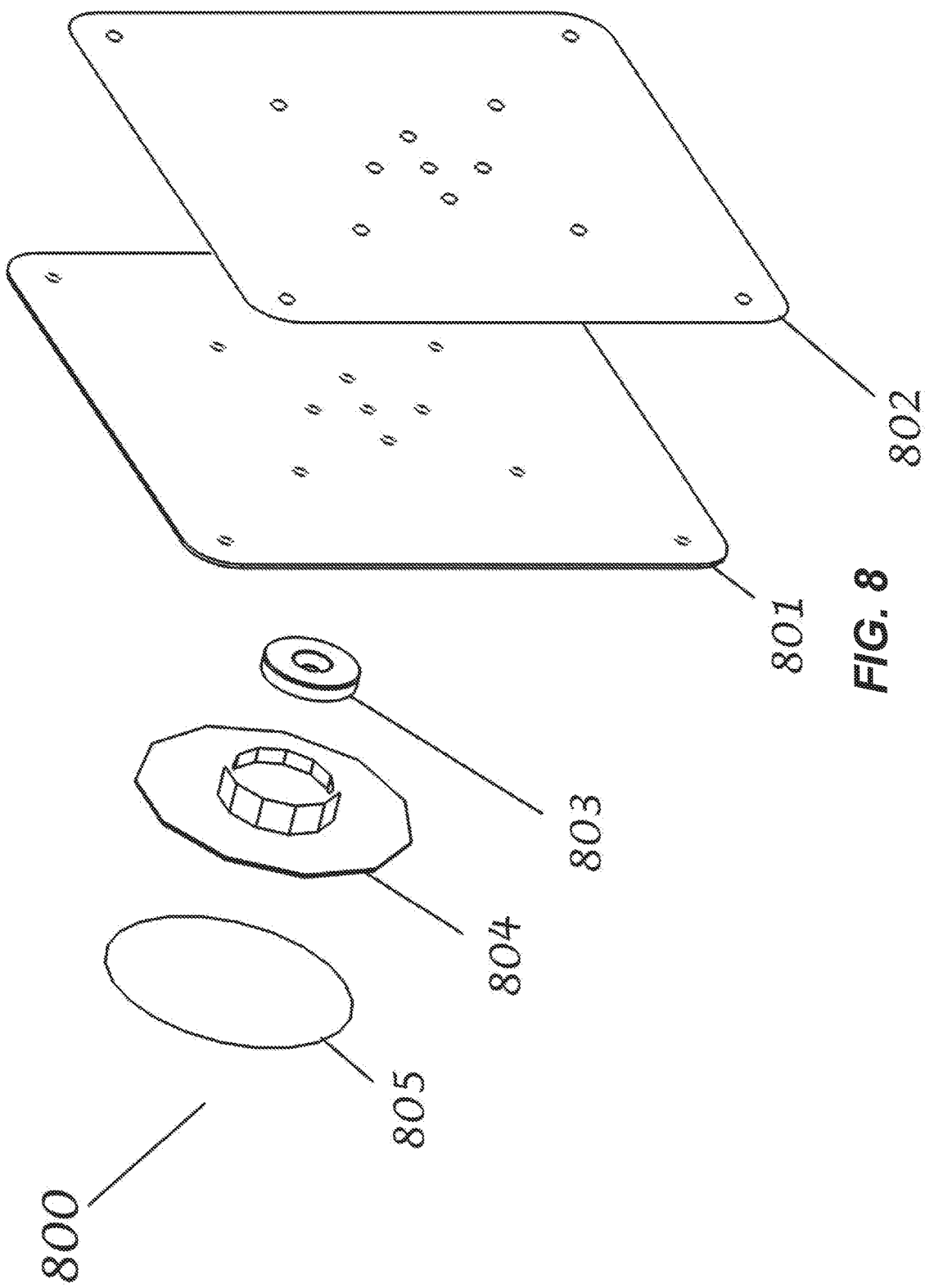
FIG. 8 illustrates an exploded perspective view of an alternative surface mount with a simplified attachment feature according to an exemplary embodiment.

FIG. 8 illustrates an exploded perspective view of an alternative surface mount 800 with a simplified attachment feature according to an exemplary embodiment.

This exemplary device may provide a single magnet version for small objects that provides the same functionality at very low cost. A small metallic base plate 801 with peel back adhesive 802 may be attached to the back of the small object. There may only be one magnet 803 sitting in a small magnet retaining plate 804 with peel back adhesive 805.

Aside from use for small and very light objects, this single magnet version of the device can be placed at multiple locations on the back of larger and heavier objects as well hence giving flexibility in customizing the way the magnets are distributed on the back of the object, such as for use with irregularly shaped objects, objects with uneven weight distributions, etc.

Figure 9:
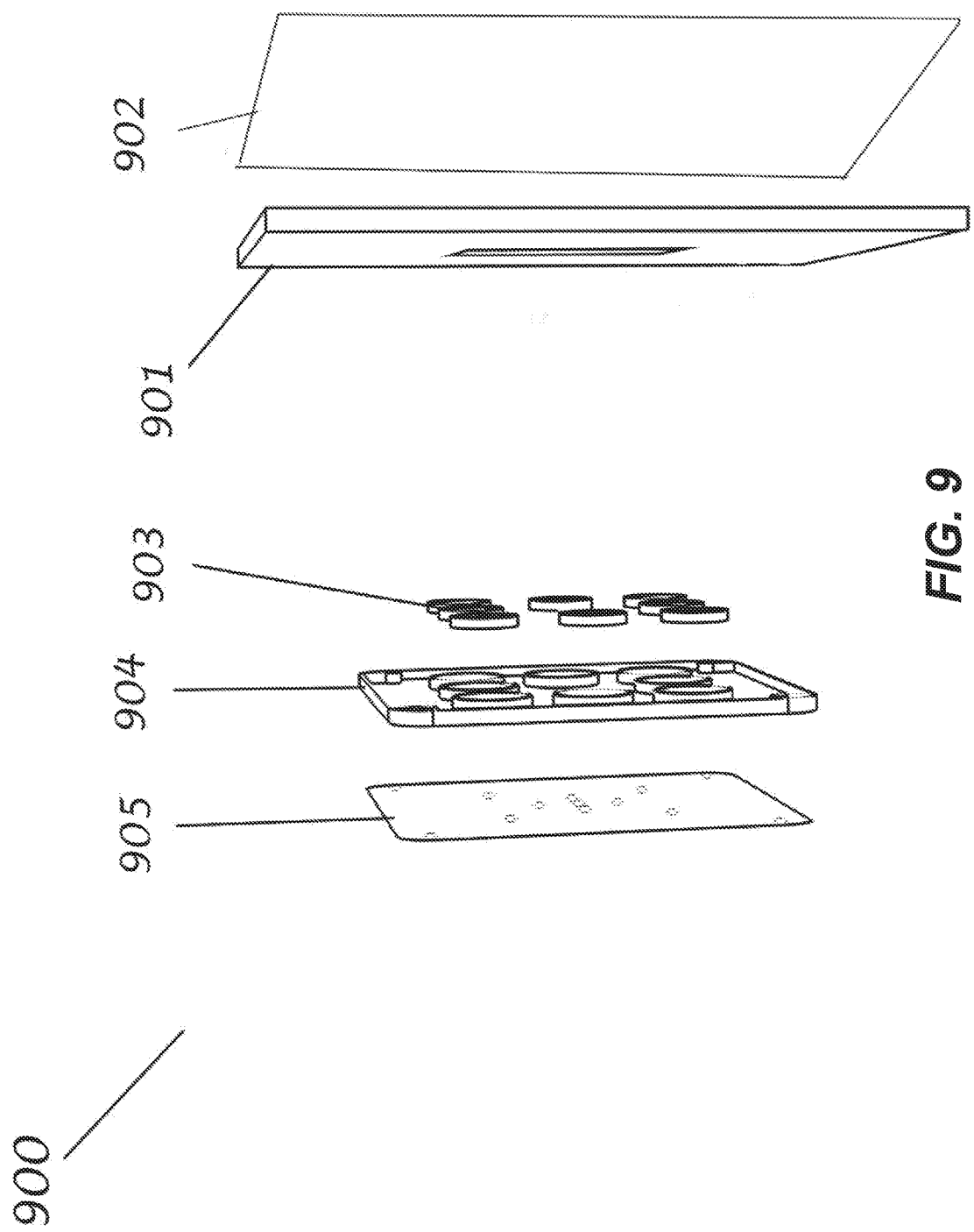
FIG. 9 illustrates an exploded perspective view of an embedded surface mount according to an exemplary embodiment.

FIG. 9 illustrates an exploded perspective view of an embedded surface mount 900 according to an exemplary embodiment. In this example, the metallic base plate (not shown, may be similar to plate 101 described above) may be embedded in the back of a mounting board 901. The mounting board may include a peel back adhesive layer 902 on the front side for attaching to a picture or poster. Alternatively, the mounting board may be associated with a frame or other appropriate element.

The magnets 903 may have the same arrangement as above and sit in the magnet retaining plate 904 with peel back adhesive 905 that is used to attach the magnet retaining plate 904 to the wall.

The foregoing relates to illustrative details of exemplary embodiments and modifications may be made without departing from the scope of the disclosure as defined by the following claims.

We claim:

1. A surface mount 100 comprising:
   a metallic base plate 101 with a first surface configured to attach to a mounting object;
   a set of magnets 103 configured to movably couple through magnetic force to a second surface of the metallic base plate that is opposite to the first surface of the metallic base plate 101;
   a magnet retaining plate 104 that retains the set of magnets 103,
   wherein the set of magnets 103 and the magnet retaining plate 104 are configured to fixedly couple to a mounting surface and the metallic base plate 101 is configured to fixedly couple to the mounting object; and
   a set of magnetic marking pegs 106 configured to insert through a plurality of magnets from the set of magnets, a set of holes in the magnet retaining plate, and into a set of holes in the metallic base plate in order to mark the mounting surface to identify, while the metallic base plate is attached to the mounting object, locations of a set of holes to attach the surface mount to the mounting surface, wherein the metallic base plate and the magnetic marking pegs are magnetically coupled to the plurality of magnets while the mounting surface is marked.

2. The surface mount of claim 1 further comprising a peel back adhesive layer attached to the first surface of the metallic base plate to attach the metallic base plate to the mounting object.

3. The surface mount of claim 1, wherein the metallic base plate comprises a set of through-holes configured to attach the metallic base plate to the mounting object by a set of screws.

4. The surface mount of claim 1 further comprising at least one spacer configured to be fixedly attached between the magnet retaining plate and the mounting surface, wherein the set of magnetic marking pegs is further configured to insert through a set of holes in the at least one spacer.

5. The surface mount of claim 1, wherein at least one magnet from the set of magnets comprises a countersink hole, the set of marking pegs configured to insert into the countersink hole of the at least one magnet to mark the mounting surface.

6. The surface mount of claim 1, wherein each magnet in the set of magnets comprises a through hole and the magnet retaining plate comprises a first set of through holes, each through hole in the first set of through holes associated with a particular magnet through hole.

7. The surface mount of claim 1, wherein the magnet retaining plate comprises a peel back adhesive layer on one surface that is configured to fixedly couple the magnet retaining plate to the mounting surface.

8. The surface mount of claim 1, wherein the set of magnetic marking pegs comprises four pegs and each of the set of holes in the at least one spacer, the set of holes in the magnet retaining plate, and the set of holes in the metallic base plate is arranged in a rectangular shape.

9. A surface mount 400 comprising:
   a metallic base plate 401 with a first peel back adhesive layer 402 coupled to the metallic base plate 401, wherein the metallic base plate 401 is configured to be fixedly coupled to a mounting object via the first peel back adhesive layer 402;
   a set of magnets 403 configured to movably couple to the metallic base plate 401 along an opposite surface from the first peel back adhesive layer; and
   a magnet retaining plate 404 fixedly coupled to the set of magnets 403, the magnet retaining plate 404 having a set of magnet receptacles, each magnet receptacle able to accept a particular magnet from the set of magnets;
   a spacer 404 having a second peel back adhesive layer 405, wherein the spacer 404 is configured to be coupled to the magnet retaining plate 404 along an opposite surface from the set of magnets and wherein the spacer 404 is configured to be fixedly coupled to a mounting surface via the second peel back adhesive layer 405,
   a light emitting diode (LED) strip 605 coupled to the magnet retaining plate, the LED strip having a rectangular shape that spans a perimeter of the magnet retaining plate.

10. The surface mount of claim 9, wherein the mounting object is a picture frame and the mounting surface is a wall.

11. The surface mount of claim 9, wherein the set of magnets consists of one magnet.

12. The surface mount of claim 9 further comprising a controller configured to at least partly control an intensity and a color of the light emitted by the LED strip.

13. A mounting device 900 comprising:
   a first peel back adhesive layer 902 coupled to a mounting board 901;
   an embedded metallic base plate 101 fixedly coupled to the mounting board 901;

a set of magnets 903 configured to be movably coupled to the metallic base plate 101;

a magnet retaining plate 904 fixedly coupled to the set of magnets 903, the magnet retaining plate 904 having a second peel back adhesive layer 905; and at least one spacer 904 configured to be coupled to the magnet retaining plate 904 or another spacer 904, wherein the set of magnets 903 and the magnet retaining plate 904 are configured to be fixedly coupled to a mounting surface via the second peel back adhesive layer 905 and the mounting board 901 is configured to be fixedly coupled to a mounting object via the first peel back adhesive layer 902, wherein the set of magnets 903 comprises eight magnets arranged in a square pattern about a center of the magnet retaining plate.

14. The mounting device of claim 13, wherein the mounting object is printed artwork.

15. The mounting device of claim 13 further comprising a light emitting diode (LED) strip coupled to the magnet retaining plate.

\* \* \* \* \*